United States Patent
Sim et al.

(10) Patent No.: US 8,243,095 B2
(45) Date of Patent: Aug. 14, 2012

(54) RENDERING APPARATUS AND METHOD

(75) Inventors: Jae-young Sim, Yongin-si (KR); Seok-yoon Jung, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 767 days.

(21) Appl. No.: 11/889,625

(22) Filed: Aug. 15, 2007

(65) Prior Publication Data

US 2008/0180454 A1 Jul. 31, 2008

(30) Foreign Application Priority Data

Jan. 30, 2007 (KR) .................. 10-2007-0009543

(51) Int. Cl.
*G09G 5/00* (2006.01)
(52) U.S. Cl. ........................ 345/611; 345/581
(58) Field of Classification Search .............. 345/611
See application file for complete search history.

(56) References Cited

U.S. PATENT DOCUMENTS

| | | | | |
|---|---|---|---|---|
| 6,466,207 B1 * | 10/2002 | Gortler et al. | ................. | 345/427 |
| 2003/0016218 A1 * | 1/2003 | Zwicker et al. | ............... | 345/424 |
| 2005/0232515 A1 * | 10/2005 | Chae | .............................. | 382/300 |
| 2007/0216676 A1 * | 9/2007 | Lee et al. | ....................... | 345/419 |
| 2007/0216707 A1 * | 9/2007 | Lee et al. | ....................... | 345/611 |

FOREIGN PATENT DOCUMENTS

| | | |
|---|---|---|
| JP | 2006-107518 | 4/2006 |
| KR | 10-0723422 | 5/2007 |
| KR | 10-0723423 | 5/2007 |

* cited by examiner

*Primary Examiner* — Xiao M. Wu
*Assistant Examiner* — Scott E Sonners
(74) *Attorney, Agent, or Firm* — Staas & Halsey LLP (57) ABSTRACT

Provided is a rendering apparatus and method. After a rendering image is generated by forming a splat for each of points generated by projecting a model composed of a plurality of points, then a plurality of predetermined regions which extend over a boundary of the generated rendering image are selected for each splat forming the boundary of the rendering image, and a pixel value of each pixel included in each of the selected regions is corrected based on pixel values of the pixel and its surrounding pixels, thereby correcting the boundary of the rendering image to make the boundary appear to be more natural and thus improving the display quality of the rendering image.

16 Claims, 8 Drawing Sheets

| 100 | 100 | 100 | 100 | 100 | 100 | 100 | 100 | 100 |
|---|---|---|---|---|---|---|---|---|
| 100 | 100 | 100 | 100 | 100 | 100 | 100 | 100 | 100 |
| 50 | 50 | 50 | 100 | 100 | 100 | 100 | 100 | 100 |
| 40 | 40 | 40 | 50 | 50 | 100 | 100 | 100 | 100 |
| 30 | 40 | 40 | 40 | 50 | 100 | 100 | 100 | 100 |
| 30 | 30 | 40 | 40 | 40 | 50 | 100 | 100 | 100 |
| 20 | 30 | 30 | 40 | 40 | 50 | 100 | 100 | 100 |
| 10 | 20 | 30 | 30 | 40 | 50 | 100 | 100 | 100 |
| 10 | 10 | 20 | 30 | 40 | 50 | 100 | 100 | 100 |

| 1 | 0 | −1 |  |  |  |  |  |  |
|---|---|---|---|---|---|---|---|---|
| 1 | 0 | −1 |  |  |  |  |  |  |
| 1 | 0 | −1 |  |  |  |  |  |  |
|  |  |  |  |  |  |  |  |  |
|  |  |  |  |  |  |  |  |  |
|  |  |  |  |  |  |  |  |  |
|  |  |  |  |  |  | 2 | 0 | −2 |
|  |  |  |  |  |  | 2 | 0 | −2 |
|  |  |  |  |  |  | 2 | 0 | −2 |

| 1 | 1 | 0 | 2 | 3 | 0 | 1 | 0 | 1 |
|---|---|---|---|---|---|---|---|---|
| 2 | 0 | 1 | 0 | 1 | 2 | 0 | 0 | 1 |
| 30 | 40 | 30 | 0 | 3 | 2 | 1 | 1 | 0 |
| 5 | 2 | 1 | 35 | 40 | 3 | 0 | 1 | 1 |
| 1 | 0 | 0 | 1 | 45 | 2 | 1 | 0 | 1 |
| 0 | 1 | 3 | 2 | 3 | 45 | 2 | 2 | 2 |
| 1 | 1 | 0 | 0 | 0 | 40 | 1 | 3 | 0 |
| 2 | 0 | 0 | 2 | 1 | 50 | 0 | 0 | 1 |
| 3 | 0 | 1 | 0 | 0 | 40 | 1 | 0 | 1 |

RENDERING APPARATUS AND METHOD

CROSS-REFERENCE TO RELATED PATENT APPLICATION

This application claims the benefit of Korean Patent Application No. 10-2007-0009543, filed on Jan. 30, 2007, in the Korean Intellectual Property Office, the disclosure of which is incorporated herein in their entirety by reference.

BACKGROUND OF THE INVENTION

1. Field of the Invention

The present invention relates to rendering of graphic data, and more particularly, to a rendering apparatus and method, in which data modeled using a plurality of points is rendered using splatting.

2. Description of the Related Art

Rendering refers to a visualization task required to display modeled data on a 2-dimensional (2D) screen. In particular, point-based rendering is performed to render a model configured with a plurality of points by covering each point generated by projecting the model onto a 2D screen with a predetermined-shape splat in such a way that adjacent splats are not spaced apart from each other.

When a rendering result is composed of a plurality of splats like in point-based rendering, the realness of the rendering result may deteriorate as the shape of each of the splats becomes distinct in the rendering result. Considering that the shape of each of the splats is distinct, especially in a boundary of the rendering result due to a background of the rendering result, there is a need to correct the boundary of the rendering result to make the boundary appear to be more natural, thereby improving the display quality of the rendering result.

SUMMARY OF THE INVENTION

The present invention provides a rendering apparatus which corrects a boundary of a rendering image composed of a plurality of splats to make the boundary appear to be more natural, thereby improving the display quality of the rendering image.

The present invention also provides a rendering method which corrects a boundary of a rendering image composed of a plurality of splats to make the boundary appear to be more natural, thereby improving the display quality of the rendering image.

The present invention also provides a computer-readable recording medium having stored thereon a computer program for correcting a boundary of a rendering image composed of a plurality of splats to make the boundary appear to be more natural, thereby improving the display quality of the rendering image.

According to one aspect of the present invention, there is provided a rendering apparatus which generates a splat for each of points generated by projecting a model composed of a plurality of points in order to render the model. The rendering apparatus includes a boundary detection unit detecting a boundary of the projected model, a smoothing region selection unit selecting a plurality of predetermined regions which each extend over the detected boundary for each splat which forming the detected boundary, and a boundary correction unit correcting a pixel value of each of pixels included in each of the predetermined regions based on pixel values of surrounding pixels of each of the pixels included in each of the predetermined regions.

According to another aspect of the present invention, there is provided a rendering method which generates a splat for each of points generated by projecting a model composed of a plurality of points in order to render the model. The rendering method includes detecting a boundary of the projected model, selecting a plurality of predetermined regions which each extend over the detected boundary for each splat forming the detected boundary, and correcting a pixel value of each of pixels included in each of the predetermined regions based on pixel values of surrounding pixels of one pixel of the pixels included in each of the predetermined regions.

According to another aspect of the present invention, there is provided a computer-readable recording medium having stored thereon a computer program for executing a rendering method which generates a splat for each of points generated by projecting a model composed of a plurality of points in order to render the model. The rendering method includes detecting a boundary of the projected model, selecting a plurality of predetermined regions which each extend over the detected boundary for each splat forming the detected boundary, and correcting a pixel value of each of pixels included in each of the predetermined regions based on pixel values of surrounding pixels of one pixel of the pixels included in each of the predetermined regions.

BRIEF DESCRIPTION OF THE DRAWINGS

The above and other features and advantages of the present invention will become more apparent by describing in detail an exemplary embodiment thereof with reference to the attached drawings in which:

FIGS. 3A through 4E are reference views for explaining an operation of a boundary detection unit illustrated in FIG. 2;

DETAILED DESCRIPTION OF THE INVENTION

Hereinafter, an exemplary embodiment of the present invention will be described in detail with reference to the accompanying drawings. It should be noticed that like reference numerals refer to like elements illustrated in one or more of the drawings. In the following description of the present invention, a detailed description of known functions and configurations incorporated herein will be omitted for conciseness and clarity.

Figure 1:
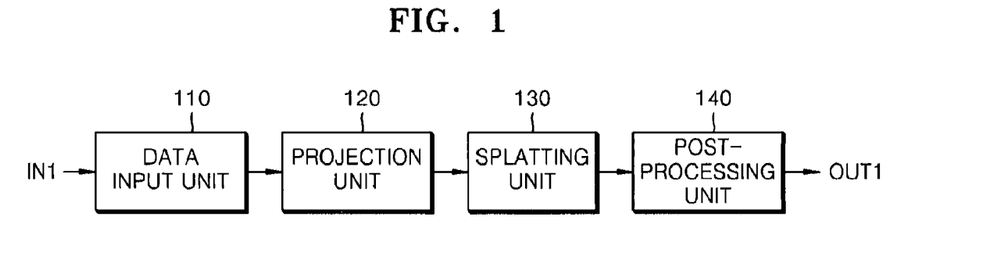
FIG. 1 is a block diagram of a rendering apparatus according to the present invention.

FIG. 1 is a block diagram of a rendering apparatus according to the present invention. Referring to FIG. 1, the rendering apparatus includes a data input unit 110, a projection unit 120, a splatting unit 130, and a post-processing unit 140. A point model is input to the data input unit 110 through an input terminal IN 1. The point model means a model composed of a plurality of points. In other words, the point model is a model modeled using the plurality of points. It is preferable that the point model is a 3-dimensional (3D) model.

The data format of an image point may vary. Here, "image point" refers to a point constituting the point model. For example, the image format may have a point cloud (PC) format or a simple texture (ST) format. Here, the PC format is a format in which an image point has color information and geometry information. The color information is information about a color expressed with a red (R) component, a green (G) component, and a blue (B) component, and the geometry information is information about a position in a 3D dimension. The ST format is a format in which an image point has color information and depth information. The depth information is information about a depth that is a distance between the image point and the viewpoint. The data format of an image format may be a PC format. If the image points constituting the input point model are not in the PC format, the data input unit 110 may convert the data format of the image point to the PC format and output the conversion result to the projection unit 120.

The projection unit 120 projects the plurality of image points constituting the point model onto a predetermined D screen. Thus, a plurality of rendering points are generated on the screen. A "rendering point" is a result of projecting the image point and has information about the image point. The screen is composed of a plurality of pixels and each of the image points is projected onto each of the pixels. Thus, when an image point is projected onto a pixel, pixel value of the pixel, e.g., a depth value and a color value of the pixel, is the depth value and the color information of the image point. The depth value of the image point is determined using geometry information of the image point.

The splatting unit 130 performs splatting. More specifically, the splatting unit 130 generates a predetermined-shape splat for each of the rendering points generated by the projection unit 120, thereby generating a rendering image. Thus, the rendering points that are merely a set of spaced points are given a 2D effect or a 3D effect. In the rendering image, adjacent splats are not spaced apart from each other.

Herein, a splat means a predetermined-shape cover covered onto a rendering point. The predetermined shape may be 2D shape like a circle or a square or may be a 3D shape like a sphere or a hemisphere. When the splat is a 2D shape, each of depth values of pixels constituting the splat is depth value of a rendering point which corresponds to the splat. However, when the splat is a 3D shape, depth values of pixels constituting the splat may vary.

The post-processing unit 140 post-processes the rendering image generated by the splatting unit 130 and outputs the post-processed result through an output terminal OUT1. More specifically, the post-processing unit 140 selects a plurality of regions extending over a boundary of the rendering image for each splat constituting the boundary of the rendering image and corrects a pixel value of each of pixels included in the selected regions based on pixel values of the pixel and its surrounding pixels. Thus, the post-processing unit 140 improves the display quality of the rendering image by correcting the boundary of the rendering image to make the boundary appear to be more natural.

Figure 2:
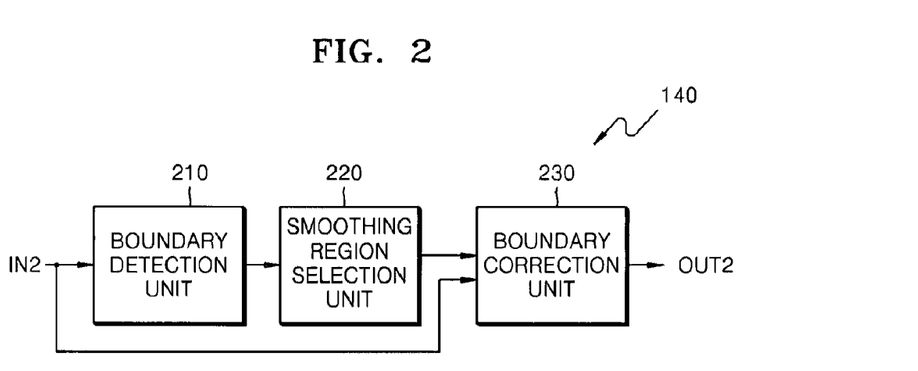
FIG. 2 is a detailed block diagram of a post-processing unit illustrated in FIG. 1 according to an exemplary embodiment of the present invention.

FIG. 2 is a detailed block diagram of the post-processing unit 140 illustrated in FIG. 1 according to an exemplary embodiment of the present invention. Referring to FIG. 2, the post-processing unit 140 includes a boundary detection unit 210, a smoothing region selection unit 220, and a boundary correction unit 230.

The boundary detection unit 210 detects the boundary of the rendering image input through an input terminal IN2 from the splatting unit 130. More specifically, the boundary detection unit 210 detects pixels constituting the boundary of the rendering image from among pixels constituting the splats that form the rendering image.

The boundary detection unit 210 detects the boundary of the rendering image based on a depth value of each of pixels constituting the screen on which the rendering image is displayed. More specifically, the boundary detection unit 210 filters a depth value of each of the pixels constituting the screen on which the rendering image is displayed, and detects the boundary of the rendering image based on the filtered results. At this time, the boundary detection unit 210 may use various filtering methods, as will be described later with reference to FIGS. 4A through 4E.

The smoothing region selection unit 220 selects a plurality of predetermined regions extending over the detected boundary for each of the splats constituting the boundary detected by the boundary detection unit 210. More specifically, for each of the pixels constituting the detected boundary, the smoothing region selection unit 220 selects a predetermined region composed of a plurality of pixels including one of the pixels constituting the detected boundary. For example, for each of the pixels constituting the detected boundary, the smoothing region selection unit 220 may select a predetermined region composed of a plurality of pixels centered on one of the pixels constituting the detected boundary.

The predetermined region has a 2D shape like a circle or a square. The smoothing region selection unit 220 also adaptively determines the size of the predetermined region according to the size of a splat which corresponds to the predetermined region and selects the predetermined region having the determined size. In this case, the size of the predetermined region is proportional to the size of the splat which corresponds to the predetermined region.

For each of the pixels included in the predetermined region selected by the smoothing region selection unit 220 among the pixels constituting the rendering image input through the input terminal IN2, the boundary correction unit 230 filters a pixel value of the pixel by correcting the pixel value based on pixel values of the pixel and its surrounding pixels, and outputs the rendering image having the filtered results through an output terminal OUT2. The boundary of the rendering image output through the output terminal OUT2 is a result of correction with respect to the boundary of the rendering image input through the input terminal IN2 to make the boundary appear to be more natural. In other words, the display quality of the rendering image output through the output terminal OUT2 is an improvement of that of the rendering image input through the input terminal IN2.

More specifically, the boundary correction unit 230 may perform median filtering for each of the pixels included in the selected region. In other words, the boundary correction unit 230 changes a color value of each of the pixels included in the selected region into a color value of 'a pixel having a median value among depth values of the pixel and its surrounding pixels'. Alternatively, the boundary correction unit 230 may perform average filtering for each of the pixels included in the selected region. In other words, for each of the pixels included in the selected region, the boundary correction unit 230 changes a color value of the one pixel into an average color value of pixels having depth values that are major with regard to a threshold value among depth values of the one pixel and its surrounding pixels. Median filtering or average filtering is only an example of filtering methods used by the boundary correction unit 230 and will be described later with reference to FIG. 6.

FIGS. 3A through 4E are reference views for explaining an operation of the boundary detection unit 210 illustrated in FIG. 2.

Figure 3A:
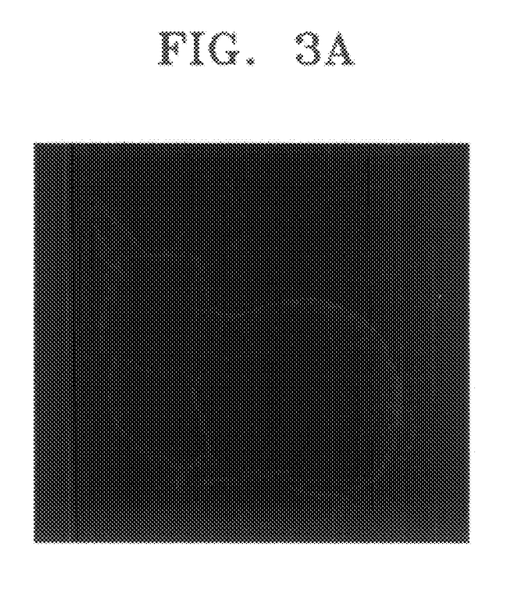
Figure 3B:
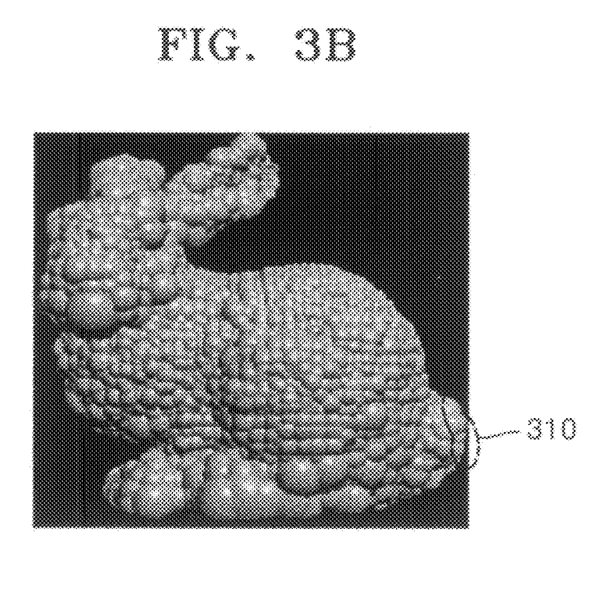
Figure 3C:
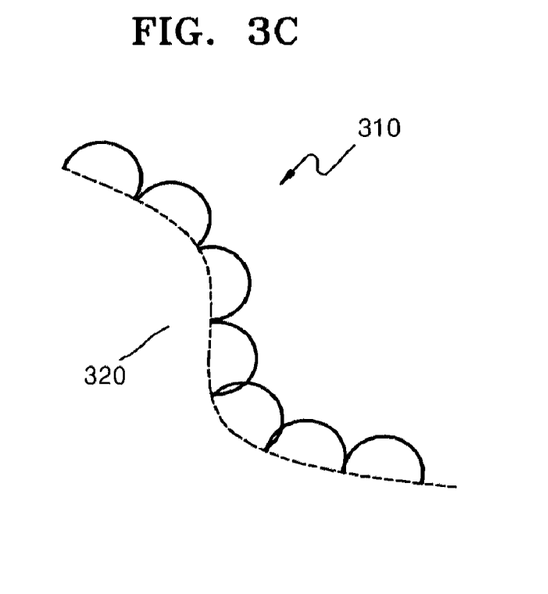

More specifically, FIG. 3A illustrates a point model of a rabbit, and FIG. 3B illustrates a rendering image obtained by rendering the point model illustrated in FIG. 3A using spherical splats. FIG. 3C illustrates an enlargement of a portion 310 of the rendering image illustrated in FIG. 3B. For convenience, the portion 310 is not entirely shown and only a part of the portion 310, which corresponds to a boundary of the rendering image, is shown in detail. In other words, 320 may indicate 'the remaining portion of each of the 7 splats illustrated in FIG. 3C' and 'splats other than the 7 splats'. In FIG. 3C, the fourth splat and the fifth splat from the left overlap each other at a certain position. As such, when a pixel of the fourth splat and a pixel of the fifth splat overlap each other, a color value of the overlapping pixel may be a color value of one of the pixel of the fourth splat and the pixel of the fifth splat, which has a smaller depth value. Similarly, the fifth splat and the sixth splat from the left overlap each other at a certain position. As such, when a pixel of the fifth splat and a pixel of the sixth splat overlap each other, a color value of the overlapping pixel may be a color value of one of the pixel of the fifth splat and the pixel of the sixth splat, which has a smaller depth value.

Figure 4A:
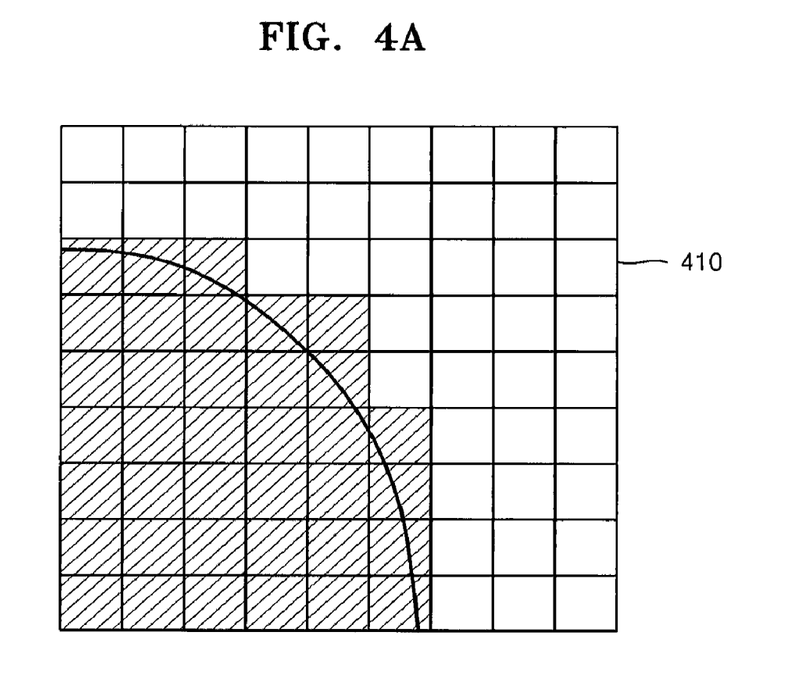

FIG. 4A illustrates one of the 7 splats illustrated in FIG. 3C on a screen 410. In FIG. 4A, each small box represents a pixel and a dashed portion indicates pixels constituting the splat.

Figure 4B:
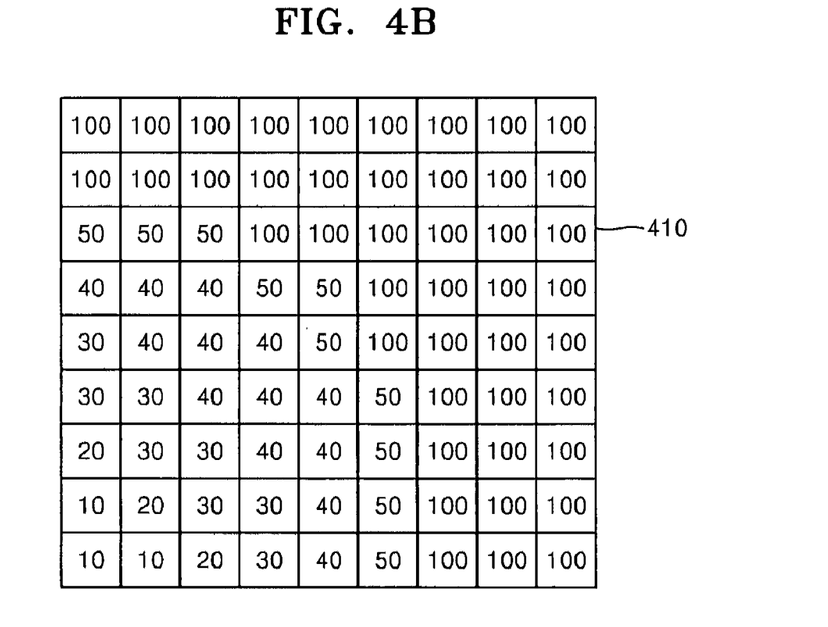

FIG. 4B illustrates depth values of pixels forming the screen 410 illustrated in FIG. 4A. In FIG. 4B, depth values of pixels forming the outside of the rendering image, e.g., the background of the rendering image, are 100 and depth values of pixels forming the rendering image vary from 10 to 50. The depth values of pixels constituting the splat vary because the shape of the splat is spherical.

Figure 4C:
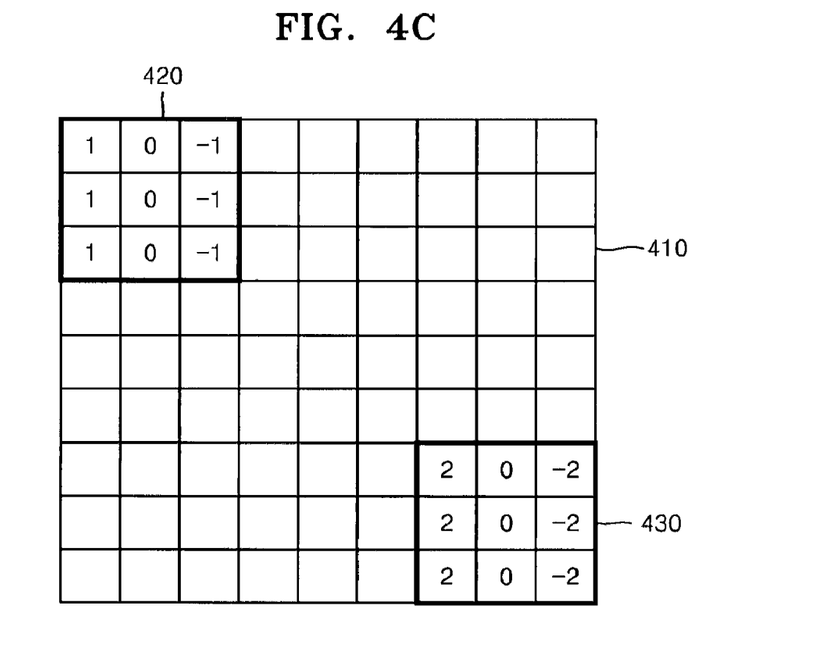

FIG. 4C is a view for explaining a filter to be used for detection of the boundary of the rendering image. In FIG. 4C, the screen 410 is composed of a total of 81 pixels in a 9×9 pixel array. The boundary detection unit 210 adds the depth value of each of the 81 pixels to results of multiplying a predetermined filter coefficient to each of depth values of the pixel and its surrounding pixels, thereby performing filtering. The filter coefficient may be set arbitrarily by a user.

In FIG. 4C, 420 indicates a filter required to filter a depth value of a pixel at (i, j)=(2, 2) among pixels in the screen 410 and 430 indicates a filter required to filter a depth value of a pixel at (i, j)=(8, 8) among pixels in the screen 410. Here, i indicates a row in which a pixel is included and j indicates a column in which a pixel is included. Thus, the position of a top and leftmost pixel in the screen 410 is (i, j)=(1, 1) and the position of a bottom and rightmost pixel in the screen 410 is (i, j)=(9, 9).

When the boundary detection unit 210 filters a depth value 100 of a pixel at (i, j)=(2, 2) using filter coefficients (1, 1, 1, 0, 0, 0, −1, −1, −1) of the filter 420, the depth value 100 of the pixel at (i, j)=(2, 2) is changed to (1*100)+(1*100)+(1*50)+(0*100)+(0*100)+(0*50)+(−1*100)+(−1*100)+(−1*50), i.e., 0. Similarly, when the boundary detection unit 210 filters the depth value 100 of a pixel at (i, j)=(8, 8) using filter coefficients (2, 2, 2, 0, 0, 0, −2, −2, −2) of the filter 430, the depth value 100 of the pixel at (i, j)=(8, 8) is changed to (2*100)+(2*100)+(2*100)+(0*100)+(0*100)+(0*100)+(−2*100)+(−2*100)+(−2*100), i.e., 0. In this way, the boundary detection unit 210 can filter depth values of all the pixels in the screen 410 from a depth value of a pixel at (i, j)=(1, 1) to a depth value of a pixel at (i, j)=(9, 9). At this time, the depth value of the pixel at (i, j)=(1, 1) may be filtered on the assumption that screens that are similar to the screen 410 exist to the left of, to the left of and above, and above the screen 410. Similarly, a depth value of a pixel at (i, j)=(9, 1) may be filtered on the assumption that screens that are similar to the screen 410 exist to the left of, to the left of and below, and below the screen 410. The depth value of the pixel at (i, j)=(9, 9) may be filtered on the assumption that screens that are similar to the screen 410 exist to the right of, to the right of and below, and below the screen 410. In this manner, depth values of pixels at (i, j)=(1, 2), (1, 3), (1, 4), (1, 5), (1, 6), (1, 7), (1, 8) may be filtered on the assumption that a screen that is similar to the screen 410 exists above the screen 410. Likewise, depth values of pixels at (i, j)=(2, 1), (3, 1), (4, 1), (5, 1), (6, 1), (7, 1), (8, 1) may be filtered on the assumption that a screen that is similar to the screen 410 exists to the left of the screen 410. Similarly, depth values of pixels at (i, j)=(9, 2), (9, 3), (9, 4), (9, 5), (9, 6), (9, 7), (9, 8) may be filtered on the assumption that a screen that is similar to the screen 410 exists below the screen 410. Depth values of pixels at (i, j)=(2, 9), (3, 9), (4, 9), (5, 9), (6, 9), (7, 9), (8, 9) may be filtered on the assumption that a screen that is similar to the screen 410 exists to the right of the screen 410.

Figure 4D:
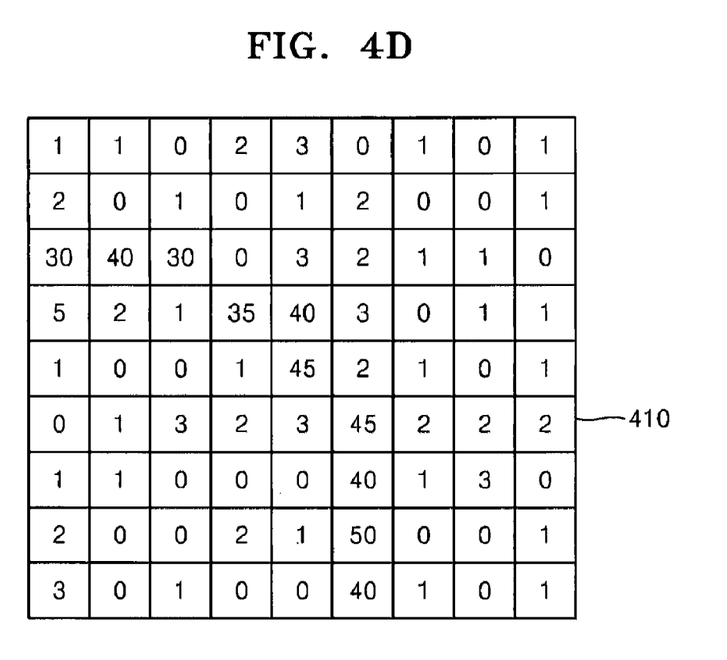
Figure 4E:
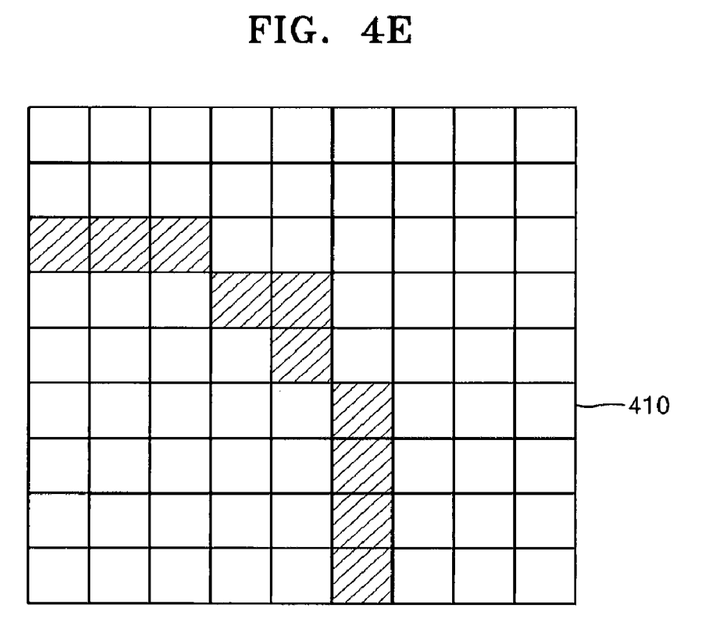

FIG. 4D illustrates results of filtering depth values indicated in FIG. 4B. The boundary detection unit 210 detects pixels having high filtered values as pixels constituting the boundary from among the 81 filtered results indicated in FIG. 4D. At this time, a criterion for detecting the high filtered values may be predetermined. In FIG. 4E, dashed pixels are the detected pixels.

Figure 5A:
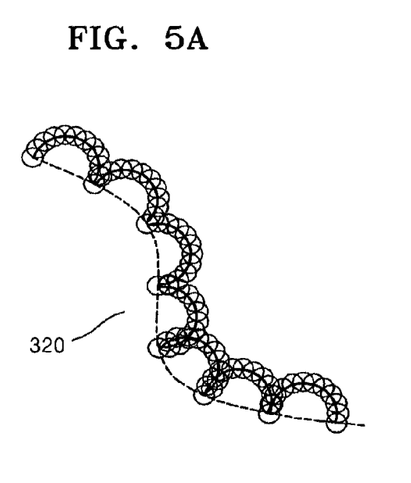
FIGS. 5A and 5B are reference views for explaining an operation of a smoothing region selection unit illustrated in FIG. 2.
Figure 5B:
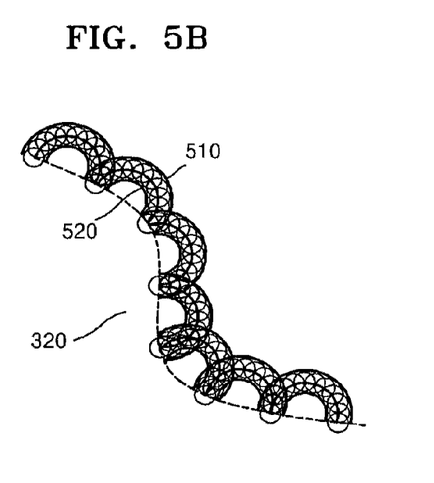

FIGS. 5A and 5B are reference views for explaining an operation of the smoothing region selection unit 220 illustrated in FIG. 2.

In FIG. 5A, for each of the pixels constituting the splats forming the boundary detected by the boundary detection unit 210, the smoothing region selection unit 220 selects pixels constituting a spherical predetermined region centered on the pixel. Although 12 predetermined regions are selected for each splat in FIG. 5 for convenience, the number of predetermined regions selected for each splat may vary.

In FIG. 5B, an outer boundary 510 and an inner boundary 520 indicate boundaries of selected predetermined regions when the number of predetermined regions selected for each of the splats forming the detected boundary is assumed to be much greater than 12. The size of a predetermined region may be proportional to the size of a splat which corresponds to the predetermined region. For example, a predetermined region for a spherical splat having a radius of r (where r is a positive integer) may be a circle having a radius of 0.2r. Since the sizes of splats illustrated in FIGS. 5A and 5B are the same as each other for convenience, the sizes of predetermined regions illustrated in FIGS. 5A and 5B are also the same as each other.

Figure 6:
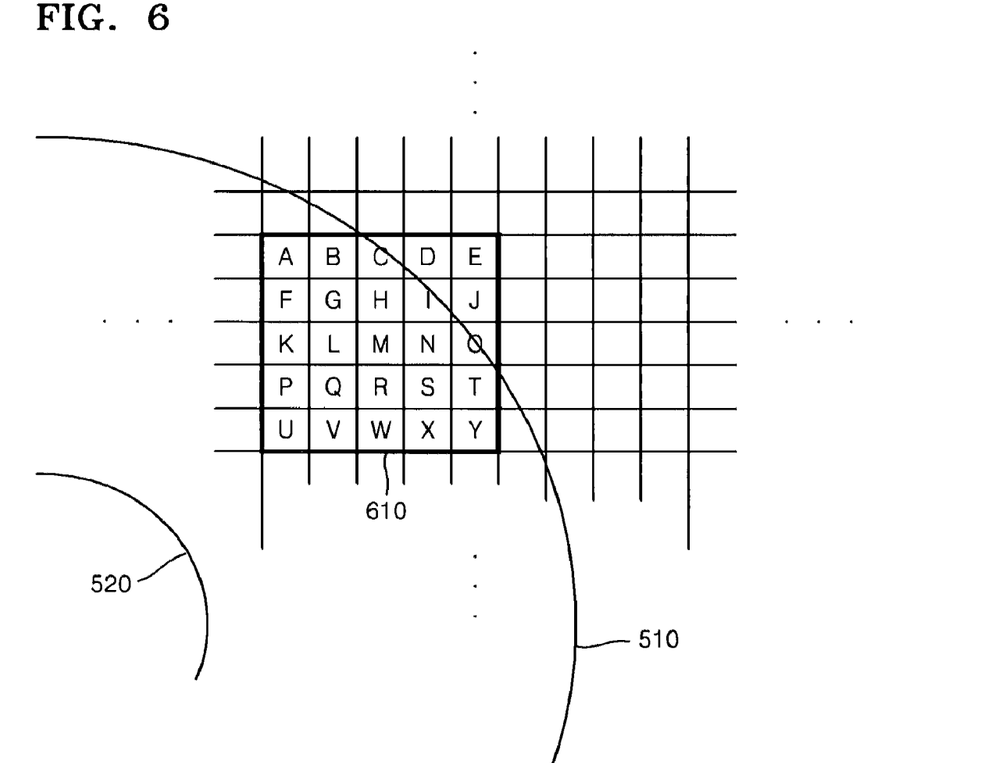
FIGS. 6 and 7 are reference views for explaining an operation of a boundary correction unit illustrated in FIG. 2.
Figure 7:
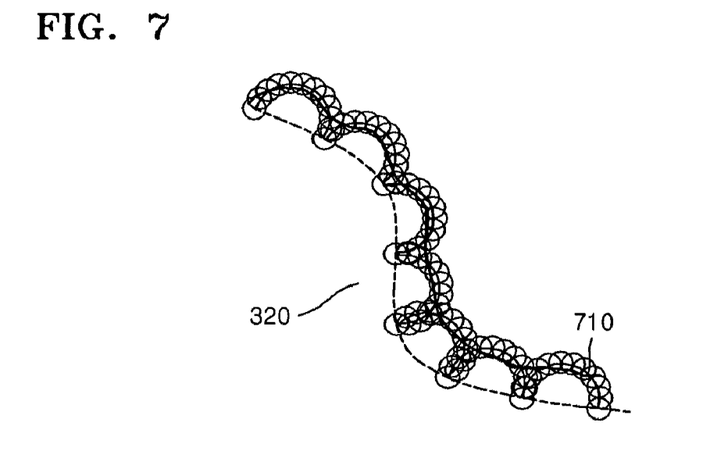

FIGS. 6 and 7 are reference views for explaining an operation of the boundary correction unit 230 illustrated in FIG. 2.

As illustrated in FIG. 6, A through Y are symbols assigned to pixels to identify the pixels. The boundary correction unit 230 corrects a pixel value of each of the pixels included in the predetermined region selected by the smoothing region selection unit 220 based on pixel values of 'the pixel and its surrounding pixels 610'. For example, the boundary correction unit 230 corrects a pixel value of a pixel M based on pixel values of pixels A to Y. At this time, the surrounding pixels of the pixel M may be only pixels G, H, I, L, N, Q, R, and S, but it is assumed that, in this case, the surrounding pixels are pixels A, B, C, D, E, F, G, H, I, J, K, L, N, O, P, Q, R, S, T, U, V, W, X, and Y for convenience of explanation.

The detailed operation of the boundary correction unit 230 may vary as described with reference to FIG. 2. Median filtering and average filtering of the boundary correction unit 230 will be described with reference to FIG. 6. However, for convenience of explanation, it is assumed that depth values of the pixels A, B, C, D, E, G, H, I, J, M, N, O, S, T, and Y are 100, depth values of the pixels F, L, R, and X are 50, depth values of pixels K, Q, and W are 45, and depth values of the pixels P, U, and V are 40.

When the boundary correction unit 230 performs median filtering on the pixel value of the pixel M, the boundary correction unit 230 may change a color value of the pixel M to a color value of 'a pixel having a median depth value among depth values of the pixels A to Y'. A median value among 25 depth values 40, 40, 40, 45, 45, 45, 50, 50, 50, 50, 100, 100, 100, 100, 100, 100, 100, 100, 100, 100, 100, 100, 100, 100, 100 arranged according to size is the $13^{th}$ depth value. Thus, the boundary correction unit 230 may change the color value of the pixel M to the color value of a pixel, e.g., the pixel G, having the $13^{th}$ depth value of 100.

When the boundary correction unit 230 performs average filtering on the pixel value of the pixel M, the boundary correction unit 230 may change a color value of the pixel M to an average of color values of pixels (A, B, C, D, E, G, H, I, J, M, N, O, S, T, Y) having depth values (100, 100, 100, 100, 100, 100, 100, 100, 100, 100, 100, 100, 100, 100, 100) that are major with regard to a threshold value (e.g. 90) from among the depth values of pixels A through Y.

FIG. 7 illustrates a rendering image after pixel values of pixels included in each selected region are entirely filtered by the boundary correction unit 230. It can be seen from FIG. 7 that a boundary 710 of the rendering image appears more natural than the boundary 310 of the rendering image illustrated in FIG. 3C.

Figure 8:
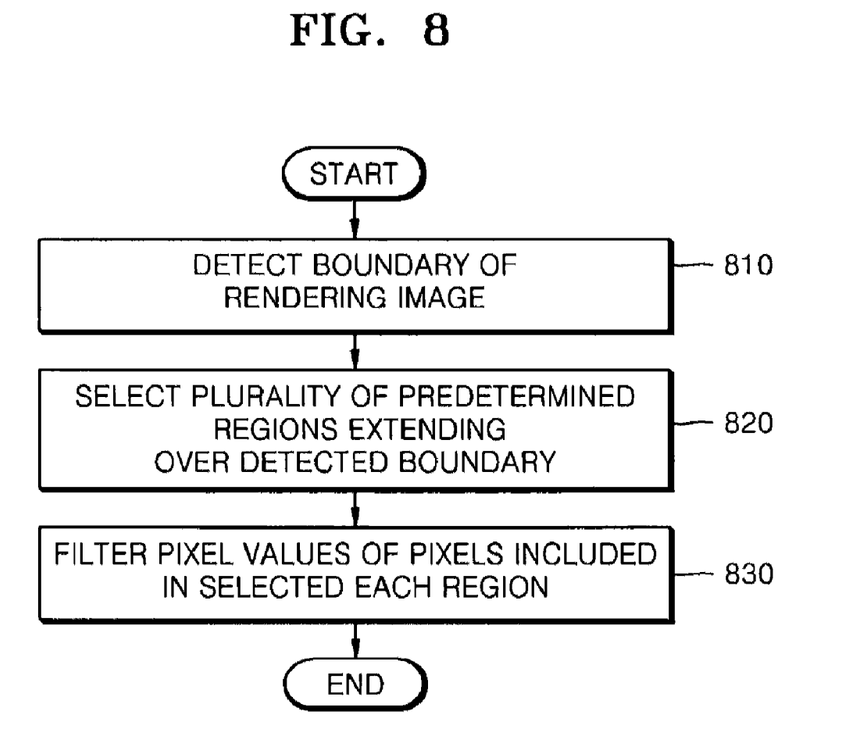
FIG. 8 is a flowchart of a rendering method according to the present invention.

FIG. 8 is a flowchart of a rendering method according to the present invention. The rendering method may include operations 810 through 830 for improving the display quality of the rendering image by correcting a boundary of a rendering image composed of a plurality of splats to make the boundary appear to be more natural.

In operation 810, the boundary detection unit 210 detects the boundary of the rendering image.

In operation 820, the smoothing region selection unit 220 selects a plurality of predetermined regions extending over the boundary detected in operation 810 for each of the splats of the detected boundary.

In operation 830, the boundary correction unit 230 corrects a pixel value of each of pixels included in each of the selected regions based on pixel values of the pixel and its surrounding pixels.

A program for executing the rendering method according to the present invention on a computer may be stored in a computer-readable recording medium. Examples of the computer-readable recording medium may include magnetic storage media, e.g., read only memory (ROM), floppy disks, and hard disks, and optical reading media, e.g., compact disc (CD)-ROM and digital versatile discs (DVDs).

As described above, according to the present invention, a splat is generated for each of points generated by projecting a model composed of a plurality of points in order to generate a rendering image, then a plurality of predetermined regions extending along a boundary of the rendering image are selected for each splat of the boundary of the rendering image, and a pixel value of each of pixels included in each of the selected regions is changed based on pixel values of the pixel and its surrounding pixels, thereby correcting the boundary of the rendering image to make the boundary appear to be more natural and thus improving the display quality of the rendering image.

Moreover, according to the present invention, the pixels forming the boundary of the rendering image are accurately detected based on a depth value of each of the pixels forming the rendering image and a plurality of pixels extending over the detected boundary are selected as pixels whose pixel values are to be corrected. Therefore, only pixel values of pixels around the boundary of the rendering image are accurately corrected and thus the size and shape of the rendering image in the screen can be maintained in spite of correction. Therefore, according to the present invention, the esthetic sense and display quality of the rendering image can be improved while maintaining fundamentals of the image.

Furthermore, according to the present invention, since the boundary of the rendering image is accurately detected based on depth values of only the pixels forming the rendering image and pixels whose pixel values are to be corrected are selected, information required to select the pixels whose pixel values are to be corrected is only depth values of the pixels forming the rendering image and information about images other than the rendering image or information other than depth values of the pixels forming the rendering image is not required to correct the boundary of the rendering image to make the boundary appear to be more natural. Therefore, the display quality of the rendering image can be improved with a small amount of memory, thereby efficiently managing memory resources.

In addition, according to the present invention, a depth value of each of the pixels forming the rendering image is filtered appropriately and the boundary of the rendering image is detected based on the filtered results, thereby the boundary of the rendering image can be accurately detected through filtering that is a simple image process.

According to the present invention, the size of each of the predetermined regions selected for each of the splats forming the boundary of the rendering image is determined adaptively according to the size of the splat. For example, when the splat which corresponds to the predetermined region is selected is a circle having a radius of r, the predetermined region is determined to be a circle having a radius of 0.2r. Thus, the present invention prevents predetermined regions having a specific size regardless of the size of the splat from being selected, thereby preventing a large predetermined region from being selected inappropriately for a small splat or a small predetermined region from being selected inappropriately for a large splat and thus effectively improving the display quality of the rendering image.

While the present invention has been particularly shown and described with reference to an exemplary embodiment thereof, it will be understood by those of ordinary skill in the art that various changes in form and detail may be made therein without departing from the spirit and scope of the present invention as defined by the following claims.

What is claimed is:

1. A rendering apparatus which generates a splat for each of points generated by projecting a model composed of a plurality of points in order to render the model, the rendering apparatus comprising:
   a boundary detection unit to detect a boundary of the projected model;
   a smoothing region selection unit to select a plurality of predetermined regions which each extend over the detected boundary for each splat forming the detected boundary, in which the size of the predetermined region is adaptively determined according to the size of the splat which corresponds to the predetermined region; and
   a boundary correction unit to correct a pixel value of each of pixels included in each of the predetermined regions based on pixel values of surrounding pixels of each of the pixels included in each of the predetermined regions.

2. The rendering apparatus of claim 1, wherein the boundary detection unit filters a depth value of each of the pixels forming the screen onto which the model is projected and detects the boundary based on filtered depth values.

3. The rendering apparatus of claim 1, wherein for each of pixels forming the detected boundary, the smoothing region selection unit selects the predetermined region composed of a plurality of pixels including the pixel forming the detected boundary.

4. The rendering apparatus of claim 3, wherein for each of the pixels forming the detected boundary, the smoothing region selection unit selects the predetermined region which has the pixel forming the detected boundary centered thereon.

5. The rendering apparatus of claim 1, wherein the shape of the splat is a circle, a square, a hemi-sphere, or a sphere.

6. The rendering apparatus of claim 1, wherein the boundary correction unit corrects a color value of each of the pixels into a color value of a pixel having a median depth value among depth values of each of the pixels and its surrounding pixels.

7. The rendering apparatus of claim 1, wherein the boundary correction unit corrects a color value of each of the pixels into an average of color values of pixels having depth values that are major with regard to a threshold value among depth values of each of the pixels and their surrounding pixels.

8. The rendering apparatus of claim 1, wherein the boundary detection unit detects the boundary based on a depth value of each of pixels forming a screen onto which the model is projected.

9. A rendering method which generates a splat for each of points generated by projecting a model composed of a plurality of points in order to render the model, the rendering method comprising:
(a) detecting a boundary of the projected model;
(b) selecting a plurality of predetermined regions which each extend over the detected boundary for each splat forming the detected boundary, in which the size of the predetermined region is adaptively determined according to the size of the splat which corresponds to the predetermined region; and
(c) correcting, performed by at least one processing device, a pixel value of each of pixels included in each of the predetermined regions based on pixel values of surrounding pixels of each of the pixels included in each of the predetermined regions.

10. The rendering method of claim 9, wherein (a) comprises filtering a depth value of each of the pixels forming the screen onto which the model is projected and detecting the boundary based on the filtered depth values.

11. The rendering method of claim 9, wherein (b) comprises, for each of pixels forming the detected boundary, selecting the predetermined region composed of a plurality of pixels including the pixel forming the detected boundary.

12. The rendering method of claim 11, wherein (b) comprises, for each of pixels forming the detected boundary, selecting the predetermined region which has the pixel forming the detected boundary centered thereon.

13. The rendering method of claim 9, wherein the shape of the splat is a circle, a square, a hemi-sphere, or a sphere.

14. A non-transitory computer-readable recording medium having stored thereon a program for executing the rendering method of any one of claims 9 or 10 to 13.

15. The rendering method of claim 9, wherein (a) comprises detecting the boundary based on a depth value of each of pixels forming a screen onto which the model is projected.

16. A rendering apparatus comprising:
a splatting unit to generate a splat for each of points generated by projecting a model composed of a plurality of points in order to render the model; and
a post-processing unit to detect a boundary of the projected model, to select a plurality of predetermined regions which each extend over the detected boundary for each splat forming the detected boundary, in which the size of the predetermined region is adaptively determined according to the size of the splat which corresponds to the predetermined region, and to correct a pixel value of each of pixels included in each of the predetermined regions based on pixel values of surrounding pixels of each of the pixels included in each of the predetermined regions.

* * * * *